Dec. 10, 1929.    C. MATLOCK    1,738,716
METHOD AND APPARATUS FOR PRODUCING CARBON BLACK
Filed Jan. 5, 1921
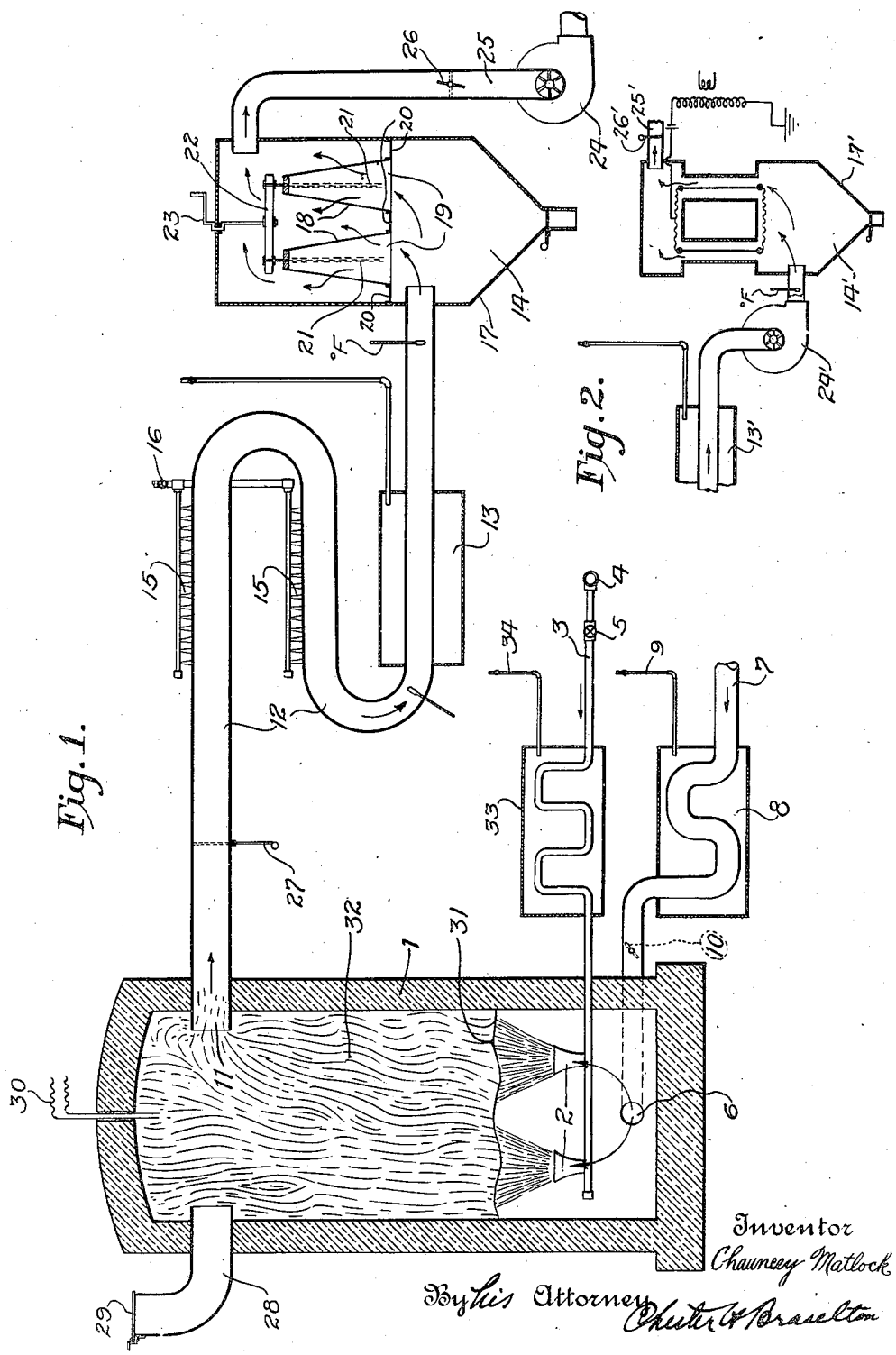

Patented Dec. 10, 1929

1,738,716

UNITED STATES PATENT OFFICE

CHAUNCEY MATLOCK, OF BROOKLYN, NEW YORK, ASSIGNOR TO MONROE-LOUISIANA CARBON COMPANY, OF MONROE, LOUISIANA, A CORPORATION OF DELAWARE

METHOD AND APPARATUS FOR PRODUCING CARBON BLACK

Application filed January 5, 1921. Serial No. 435,072.

This invention relates to the production of carbon black by the disassociation of the constituents of hydrocarbons and particularly to the disassociation of a hydrocarbon gas and the collection and recovery of the elemental carbon therefrom in the form of carbon black.

The object of my invention generally is to obtain a carbon black of improved quality from a hydrocarbon gas, for example natural gas, and to recover a larger proportion of the carbon constituent per unit volume of gas than has hitherto been possible with many known methods and devices.

A further object of my invention is a method and an apparatus for producing carbon black whereby the cost of installation and operation of the plant are reduced to a minimum and the efficiency of production generally improved, the operation, according to this method, being continuous and non-intermittent.

The method and apparatus generally used for producing carbon black on a commercial scale consists in partially burning the natural gas or other hydrocarbon gas by means of a multiplicity of miniature burners and causing the individual flames or products of combustion to play upon chilled surfaces whereon a portion of the carbon content is deposited and subsequently scraped off. The carbon black thus obtained often contains metallic iron and scale, is accompanied by agglomerated particles of carbon and often contains other impurities and characteristics which render it unsuitable for certain of its uses. Moreover the apparatus usually employed is crude and comparatively expensive to build and the collecting devices wear very rapidly, necessitating frequent periodic replacements. Further the usual commercial plants are cumbersome and occupy large areas.

Certain other methods have been suggested for the manufacture of carbon black, but none of them appear to have reached the practical or commercial stage of development.

According to my improvements I produce a carbon black of an improved character which is peculiarly free from the above mentioned injurious constituents and undesirable characteristics, and moreover, I obtain larger quantities of carbon per unit volume of gas and in a more efficient and less expensive manner than is possible with known methods and devices.

Generally stated, my improvements reside in the continuous partial or incomplete combustion of the hydrocarbon gas (preferably at substantially atmospheric pressure), in a comparatively large furnace by supplying to the furnace and to the gaseous flame predetermined quantities of preheated air which are insufficient for complete combustion, the adjustments preferably being such that the resulting products of combustion and unburned gases are more or less confined in the furnace and raised to a high temperature by heat energy from the partial combustion taking place and the subjection of the resultant products to a carbon isolating process. The gas supplied may also be preheated in certain cases instead of preheating the air, or both the gas and air may be given the required amount of heat energy prior to the partial combustion.

In accordance with certain other applications filed on even date herewith, I may employ a precooling system and a filtration or precipitation separation system for collecting the carbon after it is disassociated.

In the practice of my invention I have devised a comparatively large furnace with a battery of large burners or gas intakes with their mouths opening into the furnace at points a short distance from the bottom of the furnace, and with an air intake or intakes disposed slightly below the level of the burners. The hydrocarbon gas issuing from the gas intakes is caused to burn very slowly and lazily by supplying thereto predetermined quantities of preheated air, but insufficient to produce complete combustion, the gas being supplied at a pressure slightly above atmospheric and the burning taking place at substantially atmospheric pressure. Preferably means are provided for regulating the pressure and the volume of the gas supplied to the burners and for adjusting the quantity of air furnished to the furnace. The resulting products of combustion and unburned gases are more or less confined or trapped in the furnace and the temperature thereof elevated to the desired point for best operation. Provision is made for the gradual exhaust of the resulting products and gases through a restricted outlet near the top of the furnace. The hot products with the liberated carbon black are conducted from this outlet through a cooling system or circuit of restricted dimensions for reducing the temperature, increasing the density and reducing the volume, and thence to a collector where the carbon black is separated from the other constituents. The collector is preferably either of the electrical precipitation type or of the closed bag filtration type. A fan or blower together with an exhaust regulator is provided for the purpose of assisting to maintain the natural draft of the products of combustion and to impart thereto the required velocity through the restricted passages of the cooling system, as I find that the efficiency of operation and production is thereby increased. The hot gases with the liberated carbon in suspension are drawn through the conduits at sufficient velocity to carry along therewith the greater portion of any flocculent carbon which may be precipitated in the cooling pipes, and substantially the whole of the liberated carbon black which leaves the furnace with the gases is borne to the collector and there recovered.

The advantages of my improved method and apparatus for producing carbon black will more fully appear from the following detailed description and the accompanying drawings, the latter being a diagrammatic illustration of the system and apparatus. Fig. 1 is a diagrammatic illustration of one embodiment of my improved method and apparatus and Fig. 2 is a diagrammatic illustration of a modified collector.

Referring to these drawings I have illustrated in section a furnace 1, this furnace being of large or generous dimensions as compared with certain of the other elements of the apparatus. There are provided a number of burners 2 (only two being illustrated), which are supplied with a hydrocarbon gas, for example natural gas, through a supply pipe 3 leading to a gas main 4. A valve 5 is indicated for controlling the gas circuit and preferably the circuit is provided with a gas pressure regulator (not illustrated) for the purpose of supplying gas at a substantially uniform and constant pressure. The furnace is preferably sealed against the entrance of air or other oxygen containing agent except through an air opening 6. The air is supplied through a pipe 7 which passes through a heating chamber 8 for the purpose of preheating the air to the required temperature before it enters the furnace. The heating means may be steam which is admitted through pipe 9. A regulator 10 may be provided for adjusting the quantity of air supplied and is illustrated as of the damper type by which means the air passage may be adjusted to the required area to give the exact quantity of air (preferably at atmospheric pressure) desired. It is noted that the burners 2 are disposed near the bottom of the furnace and that the air opening 6 is disposed slightly below the level of these burners, this arrangement having been found to give good results. It is understood, however, that this arrangement may be varied within certain limits, without departing from the spirit of the invention.

Near the top of the furnace 1 there is provided a restricted outlet 11 which leads to a cooling circuit or system 12. From the cooling system 12 the furnace outlet leads through a heater 13 and from thence to a collector 14. The cooling system consists of a pipe of restricted dimensions as compared to the volume of the furnace and a water spray system 15 which may continuously spray cold water upon the cooling pipes 12 for the purpose of reducing the temperature of the products of combustion passing therethrough. The degree of cooling may be regulated by adjusting the supply of water to the spraying system as for instance by means of a valve 16 in the water main. The cooling pipes 12 are observed to slightly diminish in cross section from the front of the rearmost end. This reduction in cross section may be made because the products of combustion may be reduced in volume as they are cooled. The resulting increase in density of the gases passing through the cooling and collector system promotes the efficient separation of the carbon from the other gases.

Two different types of collectors are illustrated, collector 14 being of the bag filtration type and collector 14' being of the electrical precipitation type. The collector 14 consists generally of a container, preferably of cylindrical shape, with the hopper 17 on the lower part for collecting the carbon black as it falls by gravity or is caused to fall from the filtration bags. The filtration bags are indicated diagrammatically at 18 whose open ends register with the openings 19 in the partition plate 20 carried by the container. The bags (only two of which are shown) may be carried in any suitable manner and means may be provided, if desired, for agitating or shaking the bags to loosen the carbon black collected thereby. I have illustrated a novel chain arrangement for loosening the carbon black, a chain 21 being suspended from the bar 22 and the whole being mounted upon a crank 23 whereby the chains may be given the necessary movement for contacting with and agitating the bags. The chains preferably are suspended to hang downwardly within the bags.

A blower or exhauster 24 is provided for assisting the natural draft of the system, the blower being connected with the upper part of the collector container through a conduit 25. There is disposed within this conduit a regulating valve 26 whereby the exhaust or draft pressure may be regulated or adjusted to a nicety.

The operation of the system may be described substantially as follows:

The natural gas having been turned on (at a pressure slightly above that of the atmosphere), the burners are lighted and the air regulator 10 is adjusted to give the exact quantity of preheated air desired for the most efficient operation of the system and the products of combustion resulting from the incomplete combustion of the natural gas gradually accumulate in the furnace until the upper part thereof is completely filled with the gases and the liberated carbon black in suspension. The main gate 27 in the circuit being open the products of combustion with the suspended liberated carbon black begin to circulate through the cooling system, 12 and the blower 24 together with its regulating valve 26 are adjusted to give an exhaust pressure and velocity sufficient to carry the products of combustion together with the suspended carbon through the restricted cooling system and through the filtration bags 18 of the collector. The velocity in the cooling circuit is such that the greater portion of flocculent carbon which is precipitated or becomes deposited upon the inner walls of the cooling circuit is carried along with the main stream of products of combustion into the collector so that the greater portion of the liberated carbon black which leaves the furnace through the outlet 11 actually reaches the collector and is there filtered out and deposited into the hopper 17, the cleansed gases pass out through a conduit 25 and the blower 24.

I have found that the bag collectors operate very efficiently to filter out the liberated carbon black and that they work particularly well at temperatures below 225° F. Efficient results for instance have been obtained with the operation of the collector gases at a temperature of 170° F. to 225° F. I have also found that with the proper adjustment of the gas and air supplied to the furnace and with a proper balance of the system including the careful adjustment of the exhaust pressure and the degree of cooling that the carbon black recovered in the hopper 17 is a particularly desirable commercial product and is free from the above noted injurious constituents and undesirable qualities; moreover, the yield of carbon black per unit of gas is found to be greater than the yield of carbon black produced by many known methods and devices.

These results are noticeable to a certain degree under various conditions of operation, but are particularly marked with temperatures in the furnace of 1400° F. to 1800° F. (as measured by pyrometer 30), and with careful adjustment of the air admitted into the furnace, both the yield and quality of carbon black produced are good. A test of the gases near the top of the furnace with one adjustment showed a total absence of free oxygen, a small percentage (1.8%) of carbon monoxide ($CO$) and a larger percentage (7.7%) of carbon dioxide ($CO_2$). Good results were obtained with adjustments giving other percentages of these gases. It will be apparent that by preheating the gas and air the resulting burning mixture may be raised by the combustion of a small portion of the hydrocarbons, to a temperature sufficient to decompose or dissociate the remaining hydrocarbons. This temperature may be obtained uniformly throughout the mass of burning gases without disturbance through the cooling effect of chilling plates or other heat abstracting objects. It is also observed that with an adjustment such that the products of combustion and intermixed gases are all retained above the level of the burners 2, the yield and quality are good. For example, as indicated in Figure 1, there seems under certain conditions to be a clear and defined dividing line or blanket 31 between the gases 32 above and the air below this line, and the air entering the furnace and collecting beneath this blanket is probably preheated by the heat from the partial combustion to a certain degree before it enters the combustion space. This heat energy is accumulative of the heat energy added to the air in the heater 8.

I may also preheat the gas before it enters the furnace in some cases. For example I provide a heating chamber 33 through which passes the gas supply pipe 3. The heating agent may be steam admitted through pipe 34.

For the purpose of relieving the furnace 1 of the products of combustion or for other reasons an outlet 28 is provided and is disposed near the top of the furnace, a door 29 being positioned upon the upper end of the pipe 28 for the purpose of opening or closing the same. The heater 13 is in the nature of a steam chamber for preheating the cooled products of combustion before they enter the collectors. While I have indicated in the process as hereinabove detailed that natural hydrocarbon gases may be employed, it is, of course, possible to employ artificially generated hydrocarbon gases, the essential requirement being that the gases contain a carbon constituent separable when burned in an atmosphere deprived largely of oxygen. It is obvious, also, that while as in the case of a natural gas, a true gas non-condensible at ordinary temperatures and pressures is employed, condensible gases or vapors containing carbon constituents or mixtures of these vapors with hydrocarbons may also be employed.

In accordance with the requirements of the patent statutes I have set forth only one form of the many forms my invention is capable of assuming. The drawings being purposely diagrammatic for convenience in illustration, and it is understood that the claims annexed hereto are not to be construed as limited to the exact methods and devices illustrated, except as is specifically recited therein, but are to be construed to cover all modifications coming within the spirit of the invention.

I claim:

1. The method of separating and recovering carbon black from a hydrocarbon gas which comprises partially burning the gas by supplying thereto a regulated quantity of preheated air.

2. The method of separating and recovering carbon black from a hydrocarbon gas which consists first, in preheating the gas; second, preheating to the desired temperature a quantity of air and third, partially burning the preheated gas by the supply of said preheated air in quantities insufficient for complete combustion.

3. The method of separating and recovering carbon black from a hydrocarbon gas consisting first, in preheating the gas; second partially burning said preheated gas by the supply of preheated air in quantities insufficient for complete combustion; third, cooling the resultant products and fourth, subjecting the cooled gases to a carbon isolating process.

4. The method of separating and recovering carbon black from a hydrocarbon gas consisting first, in partially burning the gas by the supply thereto of preheated air in quantities insufficient for complete combustion; second, compressing and cooling the products of combustion and third, subjecting the cooled products to a carbon isolating process.

5. The method of separating carbon black from a hydrocarbon gas consisting first, of partially burning the gas by supplying thereto preheated air in quanties insufficient for complete combustion while permitting the products of combustion to retain the heat evolved during combustion and second, cooling the aforesaid gases and subjecting the cooled gases to a carbon black isolating process.

6. The method of separating and recovering carbon black from a hydrocarbon gas which consists first in partially burning the gas at approximately a dissociation temperature by supplying thereto preheated air in quantities insufficient for complete combustion but sufficient to maintain the said temperature whereby a portion of the carbon content is liberated and subjecting the products of combustion to a carbon black isolating process.

7. In an apparatus for separating and recovering carbon black from a hydrocarbon gas, the combination of a furnace adapted to receive and burn the gas out of contact with heat abstracting surfaces, means for supplying gas to the furnace, means for preheating the gas before it reaches the furnace, an air supply means for furnishing air in quantities insufficient for complete combustion, means for preheating the air before it is supplied to the furnace, and a collecting system for separating the liberated carbon black from the resultant products and gases.

8. A process of producing carbon black which comprises heating a hydrocarbon gas and air, burning a mixture of said heated hydrocarbon gas and air in quantity insufficient to completely oxidize said hydrocarbons and recovering the carbon black thereby produced.

9. A process of producing carbon black which comprises heating hydrocarbon gas, heating air, oxidizing said hydrocarbons with a sufficient amount of said heated air to bring said hydrocarbons to a dissociating temperature while avoiding a complete oxidization of said hydrocarbons and thereafter cooling and separating carbon black from the gaseous products thereby produced.

In testimony whereof, I affix my signature.

CHAUNCEY MATLOCK.